United States Patent
Arai

(10) Patent No.: US 11,845,302 B2
(45) Date of Patent: Dec. 19, 2023

(54) TIRE

(71) Applicant: Sumitomo Rubber Industries, Ltd., Kobe (JP)

(72) Inventor: Mahito Arai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/964,539

(22) Filed: Oct. 12, 2022

(65) Prior Publication Data

US 2023/0137297 A1 May 4, 2023

(30) Foreign Application Priority Data

Oct. 28, 2021 (JP) .................. 2021-176794

(51) Int. Cl.
*B60C 11/03* (2006.01)
*B60C 11/12* (2006.01)

(52) U.S. Cl.
CPC ...... *B60C 11/0302* (2013.01); *B60C 11/1204* (2013.01); *B60C 2011/0374* (2013.01); *B60C 2011/1213* (2013.01)

(58) Field of Classification Search
None
See application file for complete search history.

(56) References Cited

U.S. PATENT DOCUMENTS

2016/0243899 A1\* 8/2016 Miyoshi .............. B60C 11/0332

FOREIGN PATENT DOCUMENTS

JP 2019-156025 A 9/2019
NZ 213483 A \* 10/1987

\* cited by examiner

*Primary Examiner* — Cedrick S Williams
(74) *Attorney, Agent, or Firm* — Birch, Stewart, Kolasch & Birch, LLP

(57) ABSTRACT

The tire has a tread portion for which an intended tire rotational direction is specified. The tread portion comprises first inclined land portions defined between first inclined grooves. The first inclined land portion comprises an outer portion having a first wall surface and a second wall surface, and an inner portion having a third wall surface and a fourth wall surface. The angle θ1 of the first wall surface is smaller than the angle θ2 of the second wall surface, and the angle θ3 of the third wall surface is larger than the angle θ4 of the fourth wall surface.

20 Claims, 4 Drawing Sheets

TIRE

BACKGROUND OF THE INVENTION

Field of the Invention

The present disclosure relates to a tire.

Background Art

Patent Document 1 below discloses a tire having a tread portion provided with a plurality of inclined grooves extending obliquely from a first tread edge on one side in the tire axial direction toward the tire equator, a plurality of central lateral grooves crossing the tire equator and connecting to the inclined grooves, and a plurality of inclined land portions defined between the inclined grooves. The inclined land portions are provided with connecting grooves connecting between the inclined grooves.

In the tire of Patent Document 1, it is intended to improve performance on ice and snow and steering stability on dry road surfaces by improving the inclined grooves, the central lateral grooves, and the connecting grooves.

Patent Document 1: Japanese Patent Application Publication No. 2019-156025

SUMMARY OF THE INVENTION

Problems to be Solved by the Invention

In recent years, as the performance of vehicles has improved, the tires are required to have further improved traction performance and braking performance.

The present disclosure was made in view of the above circumstance, and a primary objective of the present disclosure is to provide a tire improved in traction performance and braking performance.

Means for Solving the Problems

According to the present disclosure, a tire comprises:
a tread portion for which an intended rotational direction of the tire is specified, the tread portion having a tread surface and a first tread edge on one side in the tire axial direction, the tread portion provided with a plurality of first inclined grooves extending from the first tread edge toward the tire equator while inclining to a heel side in the intended tire rotational direction, and the tread portion including a plurality of first inclined land portions defined between the first inclined grooves,
wherein
at least one of the first inclined land portions comprising an outer portion on the first tread edge side and an inner portion on the tire equator side,
the outer portion has a first wall surface defined by one of the adjacent first inclined grooves on the heel side of the outer portion, and a second wall surface defined by one of the adjacent first inclined grooves on the toe side of the outer portion, and
the inner portion has a third wall surface defined by one of the adjacent first inclined grooves on the heel side of the inner portion, and a fourth wall surface defined by one of the adjacent first inclined grooves on the toe side of the inner portion,
wherein
the angle θ1 of the first wall surface is smaller than the angle θ2 of the second wall surface, and the angle θ3 of the third wall surface is larger than the angle θ4 of the fourth wall surface, each angle being with respect to a normal line to the tread surface.

Effects of the Invention

In the tire according to the present disclosure, by adopting the above configuration, the traction performance and braking performance can be improved.

DETAILED DESCRIPTION OF THE INVENTION

Embodiment of the present disclosure will now be described in detail in conjunction with accompanying drawings.

Figure 1:
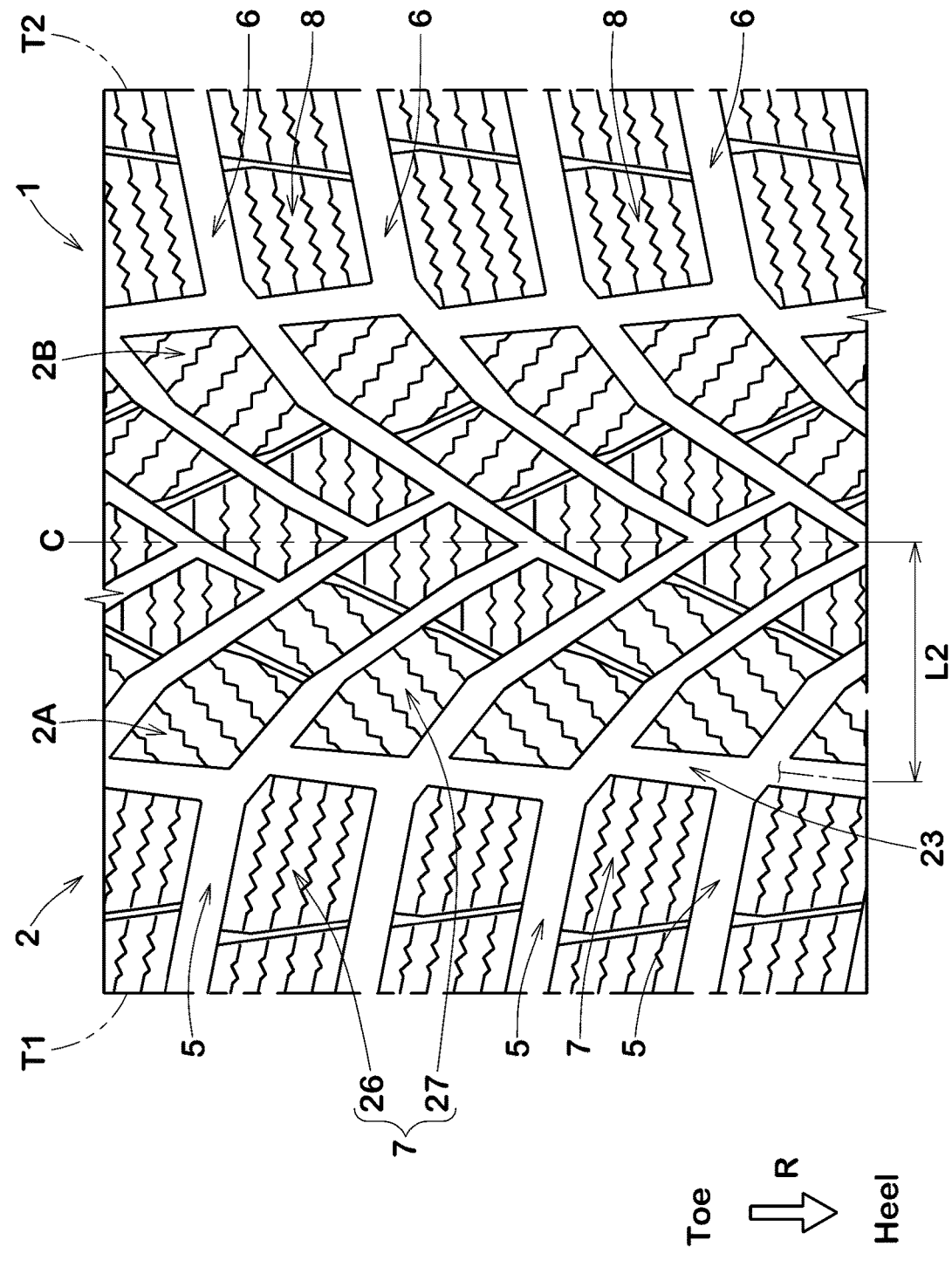
FIG. 1 is a developed partial view of a tread portion of a tire as an embodiment of the present disclosure.

FIG. 1 shows a part of a tread portion 2 of a tire 1 as an embodiment of the present disclosure. In the present embodiment, the tire 1 is a pneumatic tire for passenger cars designed for winter use. However, the present disclosure is not limited to a pneumatic tire and a winter tire (studless tire).

According to the present disclosure, the tire 1 is a unidirectional tire having an intended rotational direction R. The intended rotational direction R is indicated by letters and symbols (arrow) on the tire sidewall portions (not shown). The tread portion 2 is provided with a tread pattern bound by the intended rotational direction R.

The tread portion 2 has tread edges: a first tread edge T1 and a second tread edge T2. The tread portion 2 between the first tread edge T1 and the tire equator C is referred as a first tread portion 2A. The tread portion 2 between the second tread edge T2 and the tire equator C is referred as a second tread portion 2B. The first tread portion 2A and the second tread portion 2B are substantially line-symmetrical with respect to the tire equator C, except that they are shifted from each other in the tire circumferential direction. Therefore, the following description relating to the first tread portion 2A can be applied mutatis mutandis to the second tread portion 2B.

The first tread edge T1 and the second tread edge T2 are the axial outermost edges of the ground contacting patch of the tire 1 which occurs when the tire 1 under a normal state is contacted with a flat horizontal surface with a standard tire load at a camber angle of 0 degrees.

When the tire 1 is a pneumatic tire for which various standards have been established, the normal state means a state in which the tire is mounted on a normal rim, inflated to a normal pressure, and loaded with no tire load.

When the tire 1 is a pneumatic tire or a non-pneumatic tire, for which various standards have not been established, the normal state means a state of standard use of the tire according to the intended purpose of use of the tire and being loaded with no tire load.

In this application including specification and claims, various dimensions, positions and the like of the tire refer to those under the normal state unless otherwise noted.

The normal rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The normal pressure is the air pressure specified for the tire by the same standards organization in the Air-pressure/Maximum-load Table or similar list. For example, the normal pressure is the "maximum air pressure" in JATMA, the "Inflation Pressure" in ETRTO, the maximum pressure given in the "Tire Load Limits at Various Cold Inflation Pressures" table in TRA or the like.

When the tire 1 is a pneumatic tire for which various standards have been established, the standard tire load means a tire load specified for the tire by the same standards organization in the Air-pressure/Maximum-load Table or similar list. For example, the standard tire load is the "maximum load capacity" in JATMA, the "Load Capacity" in ETRTO, the maximum value given in the "Tire Load Limits at Various Cold Inflation Pressures" table in TRA or the like.

When the tire 1 is a tire for which various standards have not been established, the standard tire load means a maximum load that can be applied when using the tire according to the above-mentioned standards.

The tread portion 2 is provided with a plurality of first inclined grooves 5 and a plurality of second inclined grooves 6.

The first inclined grooves 5 extend from the first tread edge T1 toward the tire equator C while inclining toward the heel side in the intended tire rotational direction R.

The second inclined grooves 6 extend from the second tread edge T2 toward the tire equator C while inclining toward the heel side in the intended tire rotational direction R.

In this embodiment, the axially inner end of each of the first inclined grooves 5 is connected to one of the second inclined grooves 6, forming a T-shaped intersection. Also the axially inner end of each of the second inclined grooves 6 is connected to one of the second inclined grooves 5, forming a T-shaped intersection. In the present disclosure, however, the tire is not limited to such groove arrangement.

In this embodiment, the first inclined grooves 5 include two types: one extends across the tire equator C and ends, and the other extends to the vicinity of the tire equator C but ends before the tire equator C. Such two types are arranged alternately in the tire circumferential direction.

Also, the second inclined grooves 6 include two types: one extends across the tire equator C and ends, and the other extends to the vicinity of the tire equator C but ends before the tire equator C. Such two types are arranged alternately in the tire circumferential direction.

The groove widths of the first inclined grooves 5 and the second inclined grooves 6 are, for example, set in a range from 2 to 12 mm. The depths of the first inclined grooves 5 and the second inclined grooves 6 are, for example, set in a range from 5 to 15 mm.

The tread portion 2 comprises a plurality of first inclined land portions 7 divided by the first inclined grooves 5, and a plurality of second inclined land portions 8 divided by the second inclined grooves 6.

In this embodiment, the first inclined land portions 7 have substantially the same configurations as the second inclined land portions 8.

Figure 2:
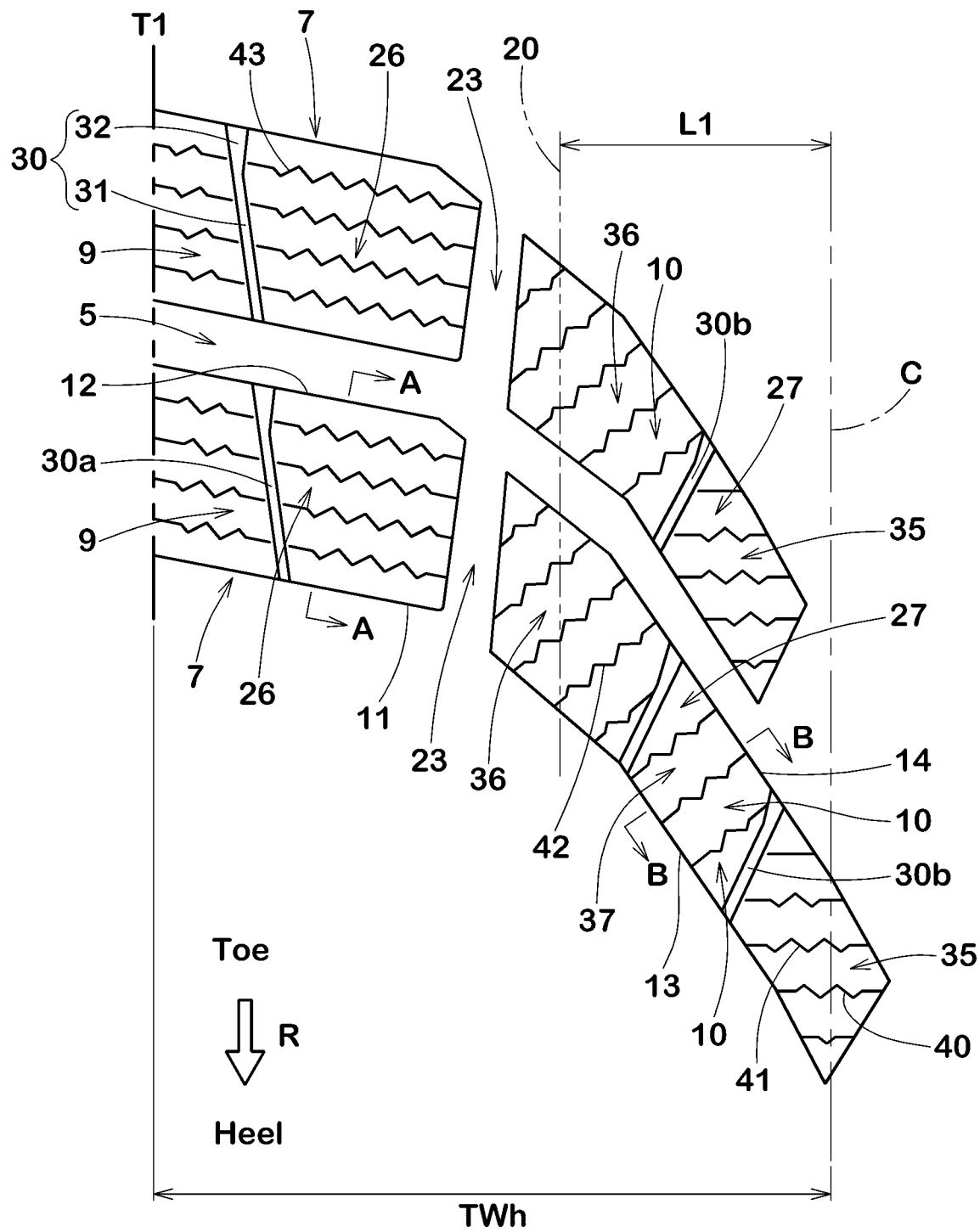
FIG. 2 enlargedly shows the first inclined land portions shown in FIG. 1.

FIG. 2 shows the two types of the first inclined land portions 7.

As shown, the first inclined land portion 7 comprises an axially outer portion 9 on the first tread edge T1 side and an axially inner portion 10 on the tire equator C side.

The axially outer portion 9 comprises a first wall surface 11 defined by the first inclined groove 5 on the heel side in the intended tire rotational direction R (lower side in the figure), and a second wall surface 12 defined by the first inclined groove 5 on the toe side in the intended rotational direction R (upper side in the figure).

The axially inner portion 10 comprises a third wall surface 13 defined by the first inclined groove 5 on the heel side in the intended tire rotational direction R, and a fourth wall surface 14 defined by the first inclined groove 5 on the toe side in the intended tire rotational direction R.

Figure 3:
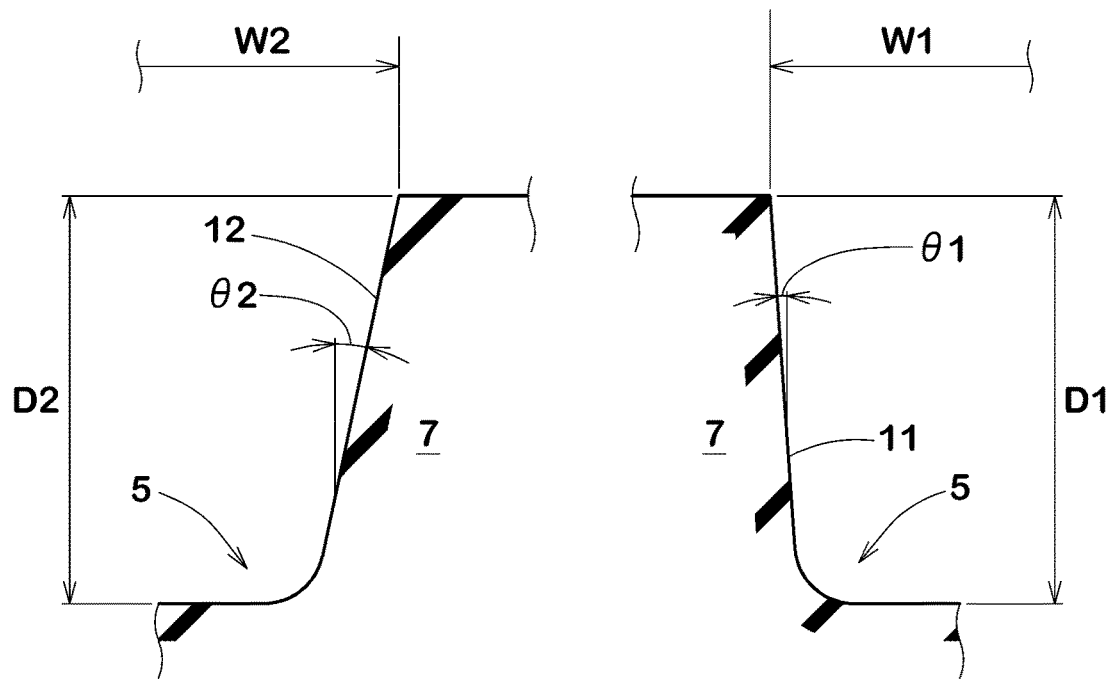
FIG. 3 is a cross-sectional view taken along line A-A of FIG. 2.

FIG. 3 shows a cross-sectional view taken along line A-A of FIG. 2.

Figure 4:
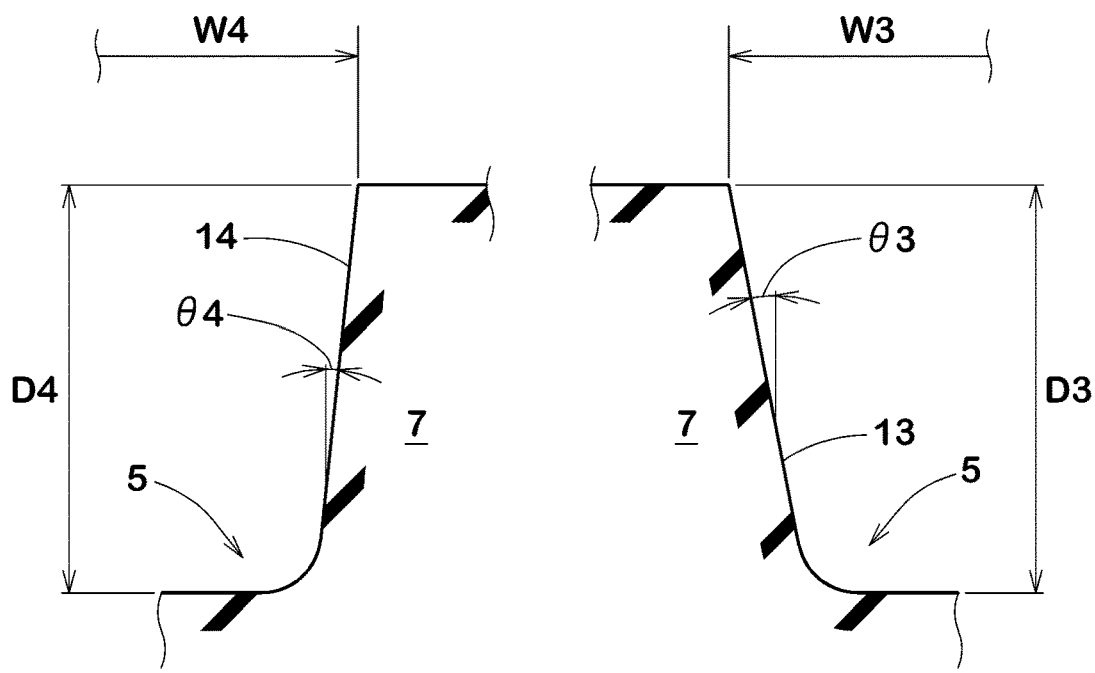
FIG. 4 is a cross-sectional view taken along line B-B of FIG. 2.

FIG. 4 shows a cross-sectional view taken along line B-B of FIG. 2.

According to the present disclosure, the angle $\theta 1$ of the first wall surface 11 is set to be smaller than the angle $\theta 2$ of the second wall surface 12, and the angle $\theta 3$ of the third wall surface 13 is set to be larger than the angle $\theta 4$ of the fourth wall surface 14, herein each angle is measured with respect to a normal line to the tread surface in a cross section perpendicular to the block edge as shown in FIGS. 3 and 4. Thus, a conditional expression 1: $\theta 1 < \theta 2$ and a conditional expression 2: $\theta 3 > \theta 4$ are satisfied. Incidentally, in FIGS. 3 and 4, the angles $\theta 1$, $\theta 2$, $\theta 3$ and $\theta 4$ are shown exaggeratingly for easy understanding.

In the tire 1 according to the present disclosure, by adopting the above configuration, the traction performance and braking performance can be improved.

As a result of various studies, the inventor obtained the following findings. That is, in a tire having first inclined land portions as described above, a large ground contact pressure acts on an axially inner part of the first inclined land portion during traction, and it is important for the traction performance to suppress the deformation of the axially inner part. On the other hand, during braking, a large ground pressure acts on an axially outer part of the first inclined land portion, and it is important for the braking performance to suppress the deformation of the axially outer part.

Based on such findings, in the axially inner portion 10 on the tire equator C side, the angle $\theta 3$ of the third wall surface is set to be larger than the angle $\theta 4$ of the fourth wall surface. Thereby, the axially inner portion 10 exerts a larger driving force, and thereby, the traction performance is improved.

On the other hand, in the axially outer portion 9 on the first tread edge T1 side, the angle $\theta 2$ of the second wall surface 12 is set to be larger than the angle $\theta 1$ of the first wall surface 11. Thereby, the axially outer portion 9 exerts a large braking force, and the braking performance is improved.

Thus, in the tire according to the present disclosure, it is possible to improve the traction performance and the braking performance.

As a technique for improving the traction performance and braking performance, conventionally employed is to decrease the volume of the grooves and increase the volume of the land portions. As a as a result, the anti-hydroplaning performance is liable to deteriorate. According to the present disclosure, however, such conventional technique is not employed, therefore, the deterioration of the anti-hydroplaning performance can be prevented.

As shown in FIG. 2, a virtual circumferential line 20 extending parallel to the tire circumferential direction is defined between the tire equator C and the first tread edge T1. The axial distance L1 from the tire equator C to the virtual circumferential line 20 is in a range from 20% to 60% of a tread half width TWh. The tread half width TWh is the axial distance from the tire equator C to the first tread edge T1 under the normal state.

Then, the axially outer portion 9 is defined as being located on the first tread edge T1 side of the virtual circumferential line 20, and the axially inner portion 10 is defined as being located on the tire equator C side of the virtual circumferential line 20. In order to reliably exert the above-described effects, the axial distance L1 is preferably in a range from 30% to 50% of the tread half width TWh.

From the viewpoint of improving the traction performance and braking performance in a well-balanced manner, the angle $\theta 1$ is 0 to 2.0 degrees, preferably 0 to 1.5 degrees, most preferably and in this embodiment 0 degrees; and the angle $\theta 2$ is 6.0 to 8.0 degrees, preferably 6.5 to 7.5 degrees. The difference between the angles $\theta 1$ and $\theta 2$ is preferably 5.0 to 7.0 degrees.

From the same viewpoint, the angle $\theta 3$ is 4.0 to 6.0 degrees, preferably 4.5 to 5.5 degrees; and the angle $\theta 4$ is 0 to 3.0 degrees, preferably 0 to 2.5 degrees, most preferably and in this embodiment 0 degrees. The difference between the angles $\theta 3$ and $\theta 4$ is preferably 2.0 to 4.0 degrees.

It is preferable that the angle $\theta 1$ is not more than the angle $\theta 4$. That is, a conditional expression 3: $\theta 1 =< \theta 4$, is satisfied.

The difference between the angles $\theta 1$ and $\theta 4$ is preferably not more than 3.0 degrees. As a result, the progress of wear in the vicinity of the first wall surface 11 and in the vicinity of the fourth wall surface 14 becomes uniform, and uneven wear is suppressed.

It is preferable that the angle $\theta 2$ is not less than the angle $\theta 3$. That is, a conditional expression 4: $\theta 2 => \theta 3$, is satisfied. The difference between the angle $\theta 2$ and the angle $\theta 3$ is preferably not more than 3.0 degrees, more preferably not more than 2.5 degrees.

As a result, the progress of wear in the vicinity of the second wall surface 12 and in the vicinity of the third wall surface 13 becomes uniform, and uneven wear is suppressed.

As shown in FIG. 3, in the region where the first wall surface 11 is formed, the adjacent first inclined groove 5 has a groove width W1 and a depth D1.

In the region where the second wall surface 12 is formed, the adjacent first inclined groove 5 has a groove width W2 and a depth D2.

As shown in FIG. 4, in the region where the third wall surface 13 is formed, the adjacent first inclined groove 5 has a groove width W3 and a depth D3.

In the region where the fourth wall surface 14 is formed, the adjacent first inclined groove 5 has a groove width W4 and a depth D4.

With respect to any one selected from the first wall surface 11, the second wall surface 12, the third wall surface 13, and the fourth wall surface 14, the angle $\theta n$ (one of $\theta 1$ to $\theta 4$) of the selected wall surface with respect to the normal line, the groove width Wn (one of W1 to W4 corresponding to the selected wall surface) of the adjacent first inclined groove 5, and the depth Dn (one of D1 to D4 corresponding to the selected wall surface) of the adjacent first inclined groove 5, preferably satisfy the following conditional expression (5): $0 =< (Dn \times \tan \theta n)/Wn =< 0.2$.

In the present embodiment as a more preferable example, each of the wall surfaces 11 to 14 satisfies the conditional expression (5).

As a result, the width of each of the wall surfaces 11 to 14 in the plan view of the tread portion (the width in the groove width direction of the first inclined groove 5) is optimized. Thereby, it is possible to improve the traction performance and the braking performance while maintaining the anti-hydroplaning performance.

In the present embodiment as a still more preferable example, the conditional expressions (1) to (4) are satisfied at the same time.

That is, the conditional expression (6): $\theta 1 =< \theta 4 < \theta 3 =< \theta 2$, is satisfied.

Thereby, the traction performance and the braking performance are further improved while maintaining the anti-hydroplaning performance.

As shown in FIG. 2, each of the first inclined land portions 7 is provided with a first longitudinal groove 23, thereby including an axially outer land portion 26 defined between the first tread edge T1 and the first longitudinal groove 23, and a crown land portion 27 defined on the tire equator C side of the first longitudinal groove 23.

In this embodiment, two types of the first inclined land portions 7: a first inclined land portion 7 of which crown land portion 27 crosses the tire equator C, and a first inclined land portion 7 of which crown land portion 27 does not cross the tire equator C, are alternately disposed in the tire circumferential direction.

As shown in FIG. 1, the axial distance L2 from the tire equator C to the first longitudinal groove 23 is, for example, set in a range from 40% to 60% of the tread half width TWh (shown in FIG. 2).

It is preferable that the groove width of the first longitudinal groove 23 increases toward the heel side in the intended tire rotational direction R.

Such first longitudinal grooves 23 can strongly compact the snow in the grooves by utilizing the rotation of the tire, and can improve performance on snow.

Preferably, the first longitudinal groove 23 is inclined to the first tread edge T1 toward the heel side in the intended tire rotational direction R.

The angle of the first longitudinal groove 23 with respect to the tire circumferential direction is, for example, 5 to 15 degrees.

Thereby, when running on snow, the snow in the first longitudinal groove 23 can be easily discharged, and excellent performance on snow can be maintained.

It is preferable that the first longitudinal grooves 23 which are arranged in the tire circumferential direction, are inclined so as not to form a region extending straight and continuously in the tire circumferential direction through the first longitudinal groove 23 while having a certain width.

It is preferable that the tread portion 2 is not provided with straight grooves extending continuously in the tire circumferential direction. This improves the rigidity of the tread portion 2 in the tire axial direction.

As shown in FIG. 2, each of the first inclined land portions 7 is provided with a plurality of longitudinal shallow grooves 30.

The longitudinal shallow grooves 30 extend between the first inclined grooves 5 on both sides in the tire circumferential direction, completely crossing the first inclined land portion 7. The depths of the longitudinal shallow grooves 30 are in a range from 25% to 50% of the depth of the first longitudinal groove 23.

The longitudinal shallow grooves 30 in each first inclined land portion 7 include one axially outer longitudinal shallow groove 30a provided in the axially outer land portion 26, and one or two axially inner longitudinal shallow grooves 30b provided in the crown land portion 27.

In the present embodiment, each longitudinal shallow groove 30 has a groove width which increases toward the toe side in the intended rotational direction R.
The longitudinal shallow groove 30 comprises a first portion 31 having a constant groove width, and a second portion 32 having a groove width increasing toward the toe side. The second portion 32 is continued from the toe side end of the first portion 31.
In such longitudinal shallow groove 30, snow in the groove is easily discharged from the second portion 32 side, and it is possible to suppress the clogging of the inside of the groove with snow.

The crown land portion 27 is composed of a plurality of block pieces separated by one or two axially inner longitudinal shallow grooves 30b.
More specifically, the crown land portion 27 which is provided with only one axially inner longitudinal shallow groove 30b is composed of a crown block piece 35 closest to the tire equator C, and a middle block piece 36 defined between the axially inner longitudinal shallow groove 30b and the first longitudinal groove 23.
The crown land portion 27 which is provided with two axially inner longitudinal shallow grooves 30b is composed of a crown block piece 35 closest to the tire equator C, a first middle block piece 36 defined between the first longitudinal groove 23 and the axially inner longitudinal shallow groove 30b, and a second middle block piece 37 defined between the two axially inner longitudinal shallow grooves 30b.

In this embodiment, the first middle block piece 36 is arranged on the virtual circumferential line 20 described above. As a result, the above-described axially outer portion 9 includes at least the axially outer land portion 26, and the axially outer land portion 26 is provided with the above-described first wall surface 11 and second wall surface 12. Preferably, the first wall surface 11 and the second wall surface 12 having the relationship described above are formed over the entire axially outer land portion 26.
The above-described axially inner portion 10 includes at least the crown block piece 35 and second middle block piece 37 of the crown land portion 27, and
 the crown block piece 35 and second middle block piece 37 are provided with the above-described third wall surface 13 and fourth wall surface 14.
Preferably, the third wall surface 13 and the fourth wall surface 14 having the relationship described above are formed over the entire crown block piece 35 and the entire second middle block piece 37.

In this embodiment, the angle of each of the wall surfaces of the first middle block piece 36 varies in the longitudinal direction of the first inclined groove 5, from the angle of the axially outer portion 9 to the angle of the axially inner portion 10.
Therefore, the boundary between the axially outer portion 9 and the axially inner portion 10 lies in each of the wall surfaces of the first middle block piece 36.

It is preferable that the first inclined land portions 7 are provided with a large number of sipes 40. In this embodiment, each sipe 40 extends in a zigzag manner. However, the sipes 40 are not limited to such shape, and may extend linearly.

The sipe means a small-width incision having a width of not more than 1.5 mm between its opposed two walls. The width of each sipe 40 is preferably 0.2 to 1.2 mm, more preferably 0.2 to 1.0 mm. In the present embodiment, each sipe 40 has a width within the above range over the entire depth direction. However, the sipe 40 may have a variable width in the depth direction, for example, the width may be increased in a portion in the vicinity of the bottom or a portion in the vicinity of the open top.

The sipes 40 includes crown sipes 41, middle sipes 42 and outer sipes 43.
The crown sipes 41 are provided on the crown block piece 35.
The middle sipes 42 are provided on the first middle block piece 36 or the second middle block piece 37.
The outer sipes 43 are provided on the axially outer land portion 26.
The crown sipes 41 preferably extend along the tire axial direction.
The middle sipes 42 are preferably inclined with respect to the tire axial direction to the opposite direction to the first inclined grooves 5.
The outer sipes 43 preferably extends along the first inclined grooves 5.
When the sipe 40 extends in a zigzag shape as in the present embodiment, it is desirable that the center line of the zigzag amplitude of the sipe has the above configurations regarding the extending direction and inclining direction.

Figure 5:
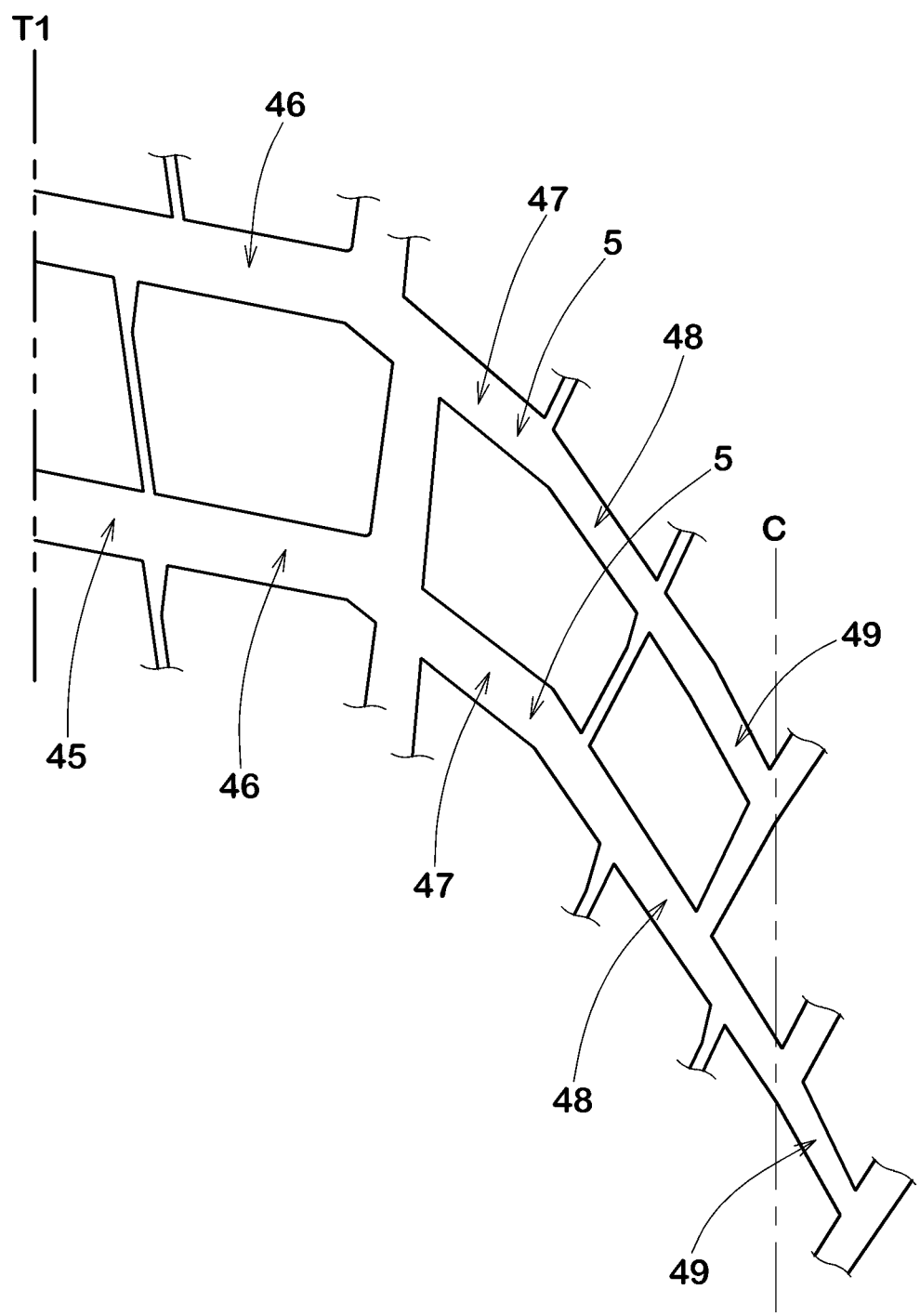
FIG. 5 shows the outlines of the first inclined grooves shown in FIG. 1.

FIG. 5 shows an enlarged view of the contour of the first inclined groove 5 of FIG. 1. In FIG. 5, the sipes arranged in the land portions are omitted.
As shown, the angle of the first inclined groove 5 with respect to the tire axial direction is increased from the first tread edge T1 side toward the tire equator C side.
Such first inclined groove 5 generate snow shear forces in multiple directions, which helps to improve the traction performance and cornering performance on snow.

It is preferable that, the first inclined groove 5 comprises a plurality of linear groove portions 45 each of which extend linearly while being inclined with respect to the tire axial direction.
More preferably and in the present embodiment, the first inclined groove 5 is made up of a plurality of linear groove portions 45, and does not have curved groove edges.
Such first inclined grooves 5 can increase the area of the land portion while maintaining the frictional force generated by the groove edge, as compared with an inclined groove formed by curved groove edges.
The first inclined groove 5 is composed of a first linear groove portion 46, a second linear groove portion 47, a third linear groove portion 48, and a fourth linear groove portion 49.
The first linear groove portion 46 extends linearly from the first tread edge T1 while being inclined with respect to the tire axial direction.
The second linear groove portion 47 extends linearly from the first linear groove portion 46 at an inclination angle larger than that of the first linear groove portion 46 with respect to the tire axial direction.
The third linear groove portion 48 extends linearly from the second linear groove portion 47 at an inclination angle larger than that of the second linear groove portion 47 with respect to the tire axial direction.

The fourth linear groove portion 49 extends linearly from the third linear groove portion 48 at an inclination angle larger than that of the third linear groove portion 48 with respect to the tire axial direction.

The angle of the first linear groove portion 46 with respect to the tire axial direction is, for example, 5 to 15 degrees. The length of the first linear groove portion 46 along its length direction is 25% to 40% of the total length of the first inclined groove 5 from the first tread edge T1 to the axially inner end on the tire equator C side measured along length directions of the respective linear groove portions 46 to 49. In this specification, unless otherwise noted, the length of the groove or groove portion refers to the length measured along the length direction.

The angle of the second linear groove portion 47 with respect to the tire axial direction is, for example, 30 to 40 degrees.
The length of the second linear groove portion 47 is smaller than the length of the first linear groove portion 46, and is, for example, 15% to 30% of the total length of the first inclined groove 5.

The angle of the third linear groove portion 48 with respect to the tire axial direction is, for example, 50 to 60 degrees.
The length of the third linear groove portion 48 is longer than the length of the second linear groove portion 47, and is, for example, 25% to 40% of the total length of the first inclined groove 5.

The angle of the fourth linear groove portion 49 with respect to the tire axial direction is, for example, 55 to 65 degrees.
The length of the fourth linear groove portion 49 is smaller than the length of the third linear groove portion 48, and is 5% to 15% of the total length of the first inclined groove 5, for example.

By arranging the linear groove portions 45 as described above, the traction performance and cornering performance on snow can be improved in a well-balanced manner. However, the first inclined groove 5 is not limited to a groove made up of the linear groove portions 45 arranged as above.

In order to improve dry performance and on-snow performance in a well-balanced manner, it is preferred that the tread portion 2 of the present embodiment has a land ratio Lr of 55% to 70%, for example.

Incidentally, the land ratio is the ratio Sb/Sa of the actual total ground contacting area Sb of the tread portion 2 to the overall area Sa of the tread portion 2 including grooves and sipes.

From the same viewpoint, it is preferable that the tread rubber forming the tread portion 2 has a rubber hardness Ht of 55 to 70 degrees for example.
Here, the rubber hardness means the durometer type A hardness measured at a temperature of 23 deg. C. according to the Japanese Industrial Standard (JIS) K6253.

While detailed description has been made of a preferable embodiment of the present disclosure, the present disclosure can be embodied in various forms without being limited to the illustrated embodiment.

Comparison Tests

Based on the tread pattern shown in FIG. 1, pneumatic tires of size 205/55R16 were experimentally manufactured as test tires (including working examples Ex.1-Ex.17 and comparative example Ref.1) by changing the angles θ1-θ4 as shown in Table 1.

The test tires were mounted on wheel rims (size 16×6.5) and inflated to 230 kPa and then attached to all wheels of a test vehicle (2000 cc front-wheel drive passenger car).
Using the test vehicle, the traction performance, braking performance and anti-hydroplaning performance were tested as follows.

<Traction Performance>

When the test vehicle was run on a dry road surface, the traction performance was evaluated by the test driver. The results are indicated in Table 1 by an index based on Ref.1 being 100, wherein the larger the number, the better the traction performance.

<Braking Performance>

When the test vehicle was run on the dry road surface, the braking performance was evaluated by the test driver. The results are indicated in Table 1 by an index based on Ref.1 being 100, wherein the larger the number, the better the braking performance.

<Anti-Hydroplaning Performance>

The test vehicle was run on a wet road surface, and the speed at which hydroplaning occurred was measured. The results are indicated in Table 1 by an index based on the speed of Ref.1 being 100, wherein the larger the value, the better the anti-hydroplaning performance.

TABLE 1

| Tire | Ref.1 | Ex.1 | Ex.2 | Ex.3 | Ex.4 | Ex.5 | Ex.6 | Ex.7 | Ex.8 |
| --- | --- | --- | --- | --- | --- | --- | --- | --- | --- |
| angle θ1 (deg.) | 5.0 | 0.0 | 0.5 | 1.0 | 1.5 | 2.0 | 0.0 | 0.0 | 0.0 |
| angle θ2 (deg.) | 5.0 | 7.0 | 7.0 | 7.0 | 7.0 | 7.0 | 6.0 | 6.5 | 7.5 |
| angle θ3 (deg.) | 5.0 | 5.0 | 5.0 | 5.0 | 5.0 | 5.0 | 5.0 | 5.0 | 5.0 |
| angle θ4 (deg.) | 5.0 | 0.0 | 0.0 | 0.0 | 0.0 | 0.0 | 0.0 | 0.0 | 0.0 |
| traction performance | 100 | 108 | 107 | 108 | 108 | 109 | 106 | 107 | 108 |
| braking performance | 100 | 106 | 106 | 106 | 107 | 107 | 103 | 105 | 108 |
| hydroplaning resistance | 100 | 104 | 103 | 102 | 102 | 101 | 104 | 103 | 102 |
| overall performance | 300 | 318 | 316 | 316 | 317 | 317 | 313 | 315 | 318 |

| Tire | Ex.9 | Ex.10 | Ex.11 | Ex.12 | Ex.13 | Ex.14 | Ex.15 | Ex.16 | Ex.17 |
| --- | --- | --- | --- | --- | --- | --- | --- | --- | --- |
| angle θ1 (deg.) | 0.0 | 0.0 | 0.0 | 0.0 | 0.0 | 0.0 | 0.0 | 0.0 | 0.0 |
| angle θ2 (deg.) | 8.0 | 7.0 | 7.0 | 7.0 | 7.0 | 7.0 | 7.0 | 7.0 | 7.0 |
| angle θ3 (deg.) | 5.0 | 4.0 | 4.5 | 5.5 | 6.0 | 5.0 | 5.0 | 5.0 | 5.0 |
| angle θ4 (deg.) | 0.0 | 0.0 | 0.0 | 0.0 | 0.0 | 1.0 | 1.5 | 2.0 | 3.0 |
| traction performance | 109 | 104 | 106 | 109 | 110 | 106 | 107 | 108 | 109 |
| braking performance | 109 | 106 | 107 | 107 | 108 | 106 | 106 | 107 | 108 |
| hydroplaning resistance | 100 | 104 | 103 | 102 | 100 | 103 | 103 | 101 | 100 |
| overall performance | 318 | 314 | 316 | 318 | 318 | 315 | 316 | 316 | 317 |

From the test results, it was confirmed that the working example tires were improved in the traction performance and braking performance, while maintaining the anti-hydroplaning phenomenon. Further, the working example tires exhibited excellent overall performance.

Statement of the Present Disclosure

The present disclosure is as follows.

Disclosure 1: A tire comprising:
a tread portion for which an intended rotational direction of the tire is specified, the tread portion having a tread surface and a first tread edge on one side in the tire axial direction, the tread portion provided with a plurality of first inclined grooves extending from the first tread edge toward the tire equator while inclining to a heel side in the intended rotational direction, and the tread portion including a plurality of first inclined land portions defined between the first inclined grooves, wherein
at least one of the first inclined land portions comprising an outer portion on the first tread edge side and an inner portion on the tire equator side,
the outer portion has a first wall surface defined by one of the adjacent first inclined grooves on the heel side of the outer portion, and a second wall surface defined by one of the adjacent first inclined grooves on the toe side of the outer portion, and
the inner portion has a third wall surface defined by one of the adjacent first inclined grooves on the heel side of the inner portion, and a fourth wall surface defined by one of the adjacent first inclined grooves on the toe side of the inner portion,
wherein
the angle $\theta 1$ of the first wall surface is smaller than the angle $\theta 2$ of the second wall surface, and the angle $\theta 3$ of the third wall surface is larger than the angle $\theta 4$ of the fourth wall surface, each angle being with respect to a normal line to the tread surface.

Disclosure 2: The tire according to Disclosure 1, wherein the angle $\theta 1$ is equal to or less than the angle $\theta 4$.

Disclosure 3: The tire according to Disclosure 1 or 2, wherein the angle $\theta 2$ is equal to or more than the angle $\theta 3$.

Disclosure 4: The tire according to any one of Disclosures 1 to 3, wherein
the angle $\theta n$ of any one selected from the first wall surface, the second wall surface, the third wall surface and the fourth wall surface, and
the groove width Wn and the depth Dn of the first inclined groove formed by the selected wall surface satisfy the following condition (5): $0 =< (Dn \times \tan \theta n)/Wn =< 0.2$.

Disclosure 5: The tire according to any one of Disclosures 1 to 4, wherein
the tread portion is not provided with circumferential grooves continuously extending in the tire circumferential direction.

Disclosure 6: The tire according to any one of Disclosures 1 to 5, wherein
the angle of the first inclined groove with respect to the tire axial direction increases from the first tread edge side toward the tire equator side.

Disclosure 7: The tire according to any one of Disclosures 1 to 6, wherein
the tread portion has a second tread edge on the other side in the tire axial direction,
the tread portion is provided with a plurality of second inclined grooves extending from the second tread edge toward the tire equator while inclining toward the heel side in the intended rotational direction, and
an end on the tire equator side, of each of the first inclined grooves is connected to one of the second inclined grooves, forming a T-shaped intersection.

Disclosure 8: The tire according to any one of Disclosures 1 to 7, wherein
the axially outer portion is disposed on the first tread edge side of a virtual circumferential line extending parallel to the tire circumferential direction between the tire equator and the first tread edge, and
the axially inner portion is disposed on the tire equator side of the virtual circumferential line.

Disclosure 9: The tire according to Disclosure 8, wherein
the axial distance from the tire equator to the virtual circumferential line is 20% to 60% of a tread half width from the tire equator to the first tread edge.

DESCRIPTION OF THE REFERENCE SIGNS 2 tread portion
5 first inclined groove
7 first inclined land portion
9 outer portion
10 inner portion
11 first wall surface
12 second wall surface
13 third wall surface
14 fourth wall surface
R intended tire rotational direction
T1 first tread edge
$\theta 1$ angle of first wall surface
$\theta 2$ angle of second wall surface
$\theta 3$ angle of third wall surface
$\theta 4$ angle of fourth wall surface

The invention claimed is:

1. A tire comprising:
a tread portion for which an intended rotational direction of the tire is specified, the tread portion having a tread surface and a first tread edge on one side in the tire axial direction, the tread portion provided with a plurality of first inclined grooves extending from the first tread edge toward the tire equator while inclining to a heel side in the intended rotational direction, and the tread portion including a plurality of first inclined land portions defined between the first inclined grooves, wherein
at least one of the first inclined land portions comprising an axially outer portion on the first tread edge side and an axially inner portion on the tire equator side,
the axially outer portion has a first wall surface defined by one of the adjacent first inclined grooves on the heel side of the outer portion, and a second wall surface defined by one of the adjacent first inclined grooves on the toe side of the outer portion, and
the axially inner portion has a third wall surface defined by one of the adjacent first inclined grooves on the heel side of the inner portion, and a fourth wall surface defined by one of the adjacent first inclined grooves on the toe side of the inner portion,
wherein
the angle $\theta 1$ of the first wall surface is smaller than the angle $\theta 2$ of the second wall surface, and
the angle $\theta 3$ of the third wall surface is larger than the angle $\theta 4$ of the fourth wall surface, each angle being with respect to a normal line to the tread surface, wherein
in a region where the first wall surface is formed, the adjacent first inclined groove has a groove width W1 and a depth D1, and the angle θ1 of the first wall surface satisfies the following condition: 0≤(D1×tan θ1)/W1≤0.2, in a region where the second wall surface is formed, the adjacent first inclined groove has a groove width W2 and a depth D2, and the angle θ2 of the second wall surface satisfies the following condition: 0≤(D2×tan θ2)/W2≤0.2, in a region where the third wall surface is formed, the adjacent first inclined groove has a groove width W3 and a depth D3, and the angle θ3 of the third wall surface satisfies the following condition: 0≤(D3×tan θ3)/W3≤0.2, and in a region where the fourth wall surface is formed, the adjacent first inclined groove has a groove width W4 and a depth D4, and the angle θ4 of the fourth wall surface satisfies the following condition: 0≤(D4×tan θ4)/W4≤0.2.

2. The tire according to claim 1, wherein the axially outer portion is disposed on the first tread edge side of a virtual circumferential line extending parallel to the tire circumferential direction between the tire equator and the first tread edge, and the axially inner portion is disposed on the tire equator side of the virtual circumferential line.

3. The tire according to claim 1, wherein
a second tread edge of the tread portion on a side axially opposite to the first tread edge is provided with a plurality of second inclined grooves extending from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

4. The tire according to claim 3, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and
each of the first inclined land portions is composed of a plurality of blocks including a block crossed by the virtual circumferential line.

5. The tire according to claim 1, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and
each of the first inclined land portions is composed of a plurality of blocks including a block crossed by the virtual circumferential line.

6. The tire according to claim 5, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

7. The tire according to claim 1, wherein the angle of the first inclined groove with respect to the tire axial direction increases from the first tread edge side toward the tire equator side.

8. The tire according to claim 7, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and
each of the first inclined land portions is composed of a plurality of blocks including a block crossed by the virtual circumferential line.

9. The tire according to claim 7, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

10. The tire according to claim 1, wherein the angle θ2 is equal to or more than the angle θ3.

11. The tire according to claim 10, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

12. The tire according to claim 10, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and each of the first inclined land portions is composed of a plurality of blocks including a block crossed by the virtual circumferential line.

13. The tire according to claim 12, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

14. The tire according to claim 1, wherein the angle θ1 is equal to or less than the angle θ4.

15. The tire according to claim 14, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

16. The tire according to claim 14, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and
each of the first inclined land portions is composed of a plurality of blocks including a block crossed by the virtual circumferential line.

17. The tire according to claim 16, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

18. The tire according to claim 14, wherein the angle θ2 is equal to or more than the angle θ3.

19. The tire according to claim 18, wherein
the axially outer portion is disposed on the first tread edge side of a virtual circumferential line extending parallel to the tire circumferential direction between the tire equator and the first tread edge, and the axially inner portion is disposed on the tire equator side of the virtual circumferential line,
the axial distance from the tire equator to the virtual circumferential line is 20% to 60% of a tread half width from the tire equator to the first tread edge, and
each of the first inclined land portions is composed of a plurality of blocks including a block crossed by the virtual circumferential line.

20. The tire according to claim 18, wherein
a second tread edge of the tread portion on a side axially opposite to the first tread edge is provided with a plurality of second inclined grooves that extend from the second tread edge toward the tire equator while inclining toward the heel side in the intended rotational direction,
every other said second inclined groove is connected with ends on the tire equator side of two of the first inclined grooves, forming two T-shaped intersections, and
every other said first inclined groove is connected with ends on the tire equator side of two of the second inclined grooves, forming two T-shaped intersections.

* * * * *